United States Patent
Raza et al.

(10) Patent No.: US 12,274,265 B1
(45) Date of Patent: *Apr. 15, 2025

(54) EMULSIFIABLE NEONICOTINOID PESTICIDE CONCENTRATE

(71) Applicant: IMAM MOHAMMAD IBN SAUD ISLAMIC UNIVERSITY, Riyadh (SA)

(72) Inventors: Nadeem Raza, Riyadh (SA); Sabir Razzaq, Riyadh (SA); Suryyia Manzoor, Riyadh (SA); Waseem Raza, Riyadh (SA); Muhammad Hayat, Riyadh (SA); Faisal K. Algethami, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/968,074

(22) Filed: Dec. 4, 2024

Related U.S. Application Data (63) Continuation of application No. 18/436,569, filed on Feb. 8, 2024, now Pat. No. 12,185,722.

(51) Int. Cl.
| | | |
|---|---|---|
| *A01P 7/04* | (2006.01) |
| *A01N 25/04* | (2006.01) |
| *A01N 25/30* | (2006.01) |
| *A01N 43/40* | (2006.01) |
| *A01N 43/88* | (2006.01) |
| *A01N 47/40* | (2006.01) |
| *A01N 47/44* | (2006.01) |
| *A01N 47/46* | (2006.01) |

(52) U.S. Cl.
CPC ............. *A01N 43/40* (2013.01); *A01N 25/04* (2013.01); *A01N 25/30* (2013.01); *A01N 43/88* (2013.01); *A01N 47/40* (2013.01); *A01N 47/44* (2013.01); *A01P 7/04* (2021.08)

(58) Field of Classification Search
CPC ........ A01N 47/40; A01N 47/44; A01N 47/46; A01N 43/40; A01N 25/04; A01P 7/04
See application file for complete search history.

(56) References Cited

U.S. PATENT DOCUMENTS

| 9,451,772 B2 | 9/2016 | Saxell et al. |
| 2020/0385409 A1 | 12/2020 | Aubrey et al. |

FOREIGN PATENT DOCUMENTS

| CN | 101347120 A | 1/2009 |
| CN | 101606517 B | 3/2013 |
| CN | 107318848 A | 11/2017 |
| IN | 202021042314 | 4/2022 |

OTHER PUBLICATIONS

Wieland-Berghausen et al.; Comparison of microencapsulation techniques for the water-soluble drugs nitenpyram and clomipramine HCl; Journal of Controlled Release, vol. 85, Issue 1-3; Dec. 13, 2002; 2 Pages.
Beijing Yoloo Pesticide Co., Ltd (CN101347120 (Jan. 2009)). Machine Translation. (Year: 2009).
APVMA ("Generation of storage stability data for agricultural chemical products." The Australian Pesticides and Veterinary Medicines Authority (APVMA); https://www.apvma.gov.au/registrations-and-permits/data-requirements/agricultural-data-guidelines/ chemistryn-manufacture-part-2/storage-stability. (Year: 2023).

*Primary Examiner* — Amanda L. Aguirre
*Assistant Examiner* — Chris E Simmons
(74) *Attorney, Agent, or Firm* — Oblon, McClelland, Maier & Neustadt, L.L.P.

(57) ABSTRACT

A stable emulsifiable concentrate (EC) formulation includes a solvent mixture including dimethylformamide (DMF), methanol, and xylene. The EC formulation includes one or more anionic surfactants, one or more non-ionic surfactants, and a neonicotinoid pesticide. The neonicotinoid pesticide is present in an amount of 15 to 40% weight over volume (w/v) of the solvent mixture. The EC formulation has a room temperature shelf life of at least 2 years under CIPAC guidelines.

8 Claims, 2 Drawing Sheets

FIG. 1

Sample 1: Unfit          Sample 2: Fit

EMULSIFIABLE NEONICOTINOID PESTICIDE CONCENTRATE

CROSS-REFERENCE TO RELATED APPLICATIONS

The present application is a Continuation of U.S. application Ser. No. 18/436,569, now allowed, having a filing date of Feb. 8, 2024.

BACKGROUND

Technical Field

The present disclosure is directed to a pesticidal composition and, more particularly, to an emulsifiable concentrate (EC) formulation of a neonicotinoid pesticide.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Neonicotinoid pesticide is a class of systemic insecticides that are widely used in agriculture and pest control since their first introduction in the 1990s. Featured by their structural similarity to nicotine, these pesticides exert their effects by targeting the nervous systems of insects, disrupting neural transmission and ultimately leading to insect death. Neonicotinoids are known for their efficiency and versatility, offering effective protection against a broad spectrum of pests.

Nitenpyram (NPM), a commonly employed neonicotinoid pesticide, acts as a neurotoxin and leads to paralysis or death by blocking the neural signaling of the central nervous system of an organism. It is marketed in varied compositions, such as 10% w/v solid-liquid (SL) formulation and 50% w/w water-dispersible granule formulation, depending upon its mode of application. However, these conventionally used compositions suffer from poor stability. For instance, the 50% w/w water-dispersible granule formulation undergoes degradation in sunlight, and the 10% w/v SL formulation degrades in water due to its hydrolysis. Organic solvents such as dimethylformamide (DMF) have been used to prevent hydrolysis. However, such formulations are highly expensive and not economically feasible.

CN101347120A discloses a pesticide composition containing nitenpyram and fenobucarb. The pesticide composition may be in form of an EC formulation containing about 0.5-30% of nitenpyram and 5-40% of fenobucarb, 1-25% of calcium dodecyl benzene sulphonate, 0-15% of DMF, and 10-80% of a solvent, e.g., xylene, and methyl alcohol. However, CN101347120A does not describe (i) a castor oil ethoxylate in an amount of 5.85%, and (ii) a weight ratio of the DMF to methanol to xylene about 5:2:9.

CN101606517B discloses an EC formulation containing nitenpyram, 5-70% of a stabilizing agent, 0-8% of a co-solvent, 1-25% of a mixture of calcium alkyl benzene sulfonate and castor oil ethoxylate, and 5%-20% of a plant source solvent. The plant source solvent includes alpha-pinene, Jatropha curcas methyl ester oil. However, CN101606517B does not describe (i) a nitenpyram loading in a range of 15 to 30%, and (ii) a weight ratio of the DMF to methanol to xylene about 5:2:9.

U.S. Pat. No. 9,451,772B2 discloses an EC formulation containing about 15% nitenpyram, 5-10% a surfactant mixture of calcium alkyl benzene sulfonate and castor oil ethoxylate, and about 80% of xylene. However, U.S. Pat. No. 9,451,772B2 does not describe (i) a nitenpyram loading in a range of 15 to 30%, (ii) a solvent mixture of DMF, methanol, xylene, and (iii) a weight ratio of the DMF to methanol to xylene about 5:2:9.

US20200385409A1 discloses an EC formulation containing benzoxaborole, nitenpyram, 0.1-35% a surfactant mixture of calcium alkyl benzene sulfonate and castor oil ethoxylate, and a solvent mixture of a protic solvent and an aprotic solvent. However, US20200385409A1 does not describe (i) a nitenpyram loading in a range of 15 to 30%, (ii) a solvent mixture of DMF, methanol, and xylene, and (iii) a weight ratio of the DMF to methanol to xylene about 5:2:9.

IN202021042314A discloses an EC formulation containing 0.01 to 30% dimpropyridaz, nitenpyram, 6-10% a surfactant mixture of calcium alkyl benzene sulfonate and castor oil ethoxylate, and a solvent. However, IN202021042314A does not describe (i) a nitenpyram loading in a range of 15 to 30%, (ii) a solvent mixture of DMF, methanol, and xylene, and (iii) a weight ratio of the DMF to methanol to xylene about 5:2:9.

CN107318848A discloses an aerosol formulation containing 0.5 to 30% nitenpyram, 5-25% an auxiliary agent, and a solvent. The auxiliary agent includes calcium alkyl benzene sulfonate, castor oil ethoxylate, an osmotic compound and a flame retardant. However, the prior art reference does not describe (i) an EC formulation, (ii) a solvent mixture of DMF, methanol, and xylene, and (iii) a weight ratio of the DMF to methanol to xylene about 5:2:9.

Berghausen et al. (See:Susanne Wieland-Berghausen, Uwe Schote, Michaela Frey, Friederike Schmidt, *Comparison of microencapsulation techniques for the water-soluble drugs nitenpyram and clomipramine HCl, Journal of Controlled Release*, Volume 85, Issues 1-3, 2002, 35-43) discloses a microencapsulation formulation containing nitenpyram and clomipramine HCl salt. However, Berghausen et al. does not describe (i) an EC formulation, (ii) a solvent mixture of DMF, methanol, and xylene, and (iii) a weight ratio of the DMF to methanol to xylene about 5:2:9.

Although EC formulations containing nitenpyram are used in agricultural applications, each of these compositions has certain drawbacks hindering their adoption, which indicates that there is still a need for a stable and cost-effective nitenpyram formulation.

In view of the foregoing, one objective of the present disclosure is to provide a stable and cost-effective emulsifiable concentrate (EC) formulation that circumvents the drawbacks of conventional pesticide formulations. A second objective of the present disclosure is to provide a method for making the EC formulation. A third objective of the present disclosure is to provide a method for insect control and crop protection.

SUMMARY

In an exemplary embodiment, a stable emulsifiable concentrate (EC) formulation is described. The EC formulation includes a solvent mixture containing dimethylformamide (DMF), methanol, and xylene. The EC formulation further includes one or more anionic surfactants, one or more non-ionic surfactants, and a neonicotinoid pesticide. The neonicotinoid pesticide is present in an amount of 15 to 40% weight over volume (w/v) of the solvent mixture. The EC formulation has a room temperature shelf life of at least 2 years under Collaborative International Pesticides Analytical Council Limited (CIPAC) guidelines.

In some embodiments, a volume ratio of DMF to methanol to xylene is about 5:2:9.

In some embodiments, the amount of the neonicotinoid pesticide present in the EC formulation is about 50 to 100% higher than the amount of the neonicotinoid present in an EC formulation that does not have the solvent mixture.

In some embodiments, the neonicotinoid pesticide is at least one selected from the group consisting of nitenpyram, dinotefuran, clothianidin, acetamiprid, thiacloprid, and thiamethoxam.

In some embodiments, the neonicotinoid pesticide is nitenpyram.

In some embodiments, the neonicotinoid pesticide is dinotefuran.

In some embodiments, the neonicotinoid pesticide is clothianidin.

In some embodiments, the neonicotinoid pesticide is acetamiprid.

In some embodiments, the neonicotinoid pesticide is thiacloprid.

In some embodiments, the neonicotinoid pesticide is thiamethoxam.

In some embodiments, the anionic surfactants are present in an amount of 1.5 to 7 wt. % based on a total weight of the EC formulation.

In some embodiments, the anionic surfactants are selected from the group consisting of a C6-C20 linear alkylbenzene sulfonate surfactant, a C6-C20 linear or branched alkyl sulfate surfactant, a C6-C20 linear or branched alkyl alkoxy sulfate surfactant, and combinations thereof.

In some embodiments, the non-ionic surfactants are present in an amount of 3 to 10 wt. % based on the total weight of the EC formulation.

In some embodiments, the non-ionic surfactants are selected from the group consisting of a polyglyceryl ester, a polyglyceryl ether, a polyglyceryl sorbitan fatty acid ester, and combinations thereof.

In some embodiments, the EC formulation further includes a built-in adjuvant. In some embodiments, the built-in adjuvant is a water-immiscible organic liquid.

In some embodiments, the solvent mixture has a DMF to methanol to xylene volume ratio of 5:2:9. In some embodiments, the one or more anionic surfactants include calcium alkyl benzene sulfonate in an amount of 2.5 to 3.5 wt. % based on the total weight of the EC formulation. In some embodiments, the one or more non-ionic surfactants include castor oil ethoxylate in an amount of 5 to 6.5 wt. % based on the total weight of the EC formulation. In some embodiments, the neonicotinoid pesticide is nitenpyram in the amount of 20% w/v of the solvent mixture.

In an exemplary embodiment, a method of making the EC formulation is described. The method includes mixing DMF, methanol, the one or more anionic surfactants, and the one or more anionic surfactants to form a first mixture. The method further includes mixing the neonicotinoid pesticide in the form of particles in the first mixture to form a second mixture. In some embodiments, the method further includes mixing the second mixture and xylene until the EC formulation becomes clear that the neonicotinoid pesticide particles are fully dissolved.

In some embodiments, a method for insect control includes mixing the EC formulation and water to form an emulsion containing a plurality of oil droplets. The method for insect control further includes applying an effective amount of the emulsion to plants, seeds, soil, or habitat of plants in or on which the harmful insects are growing or may grow.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the terms "compound" and "product" are used interchangeably, and are intended to refer to a chemical entity, whether in the solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those skilled in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e., constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans-(E- and Z—) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans-(or E- and Z-) stereoisomers of the compounds of the present disclosure wherein rotation around the double bond is restricted, keeping the substituents fixed relative to each other, are described and may be isolated as a mixture of isomers or as separated isomeric forms. S- and R-(or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. $-SO_2NH_2$), substituted sulfonamide, nitro, cyano, carboxy, carbamyl (e.g. $-CONH_2$), substituted carbamyl (e.g. $-CONHalkyl$, $-CONHaryl$, $-CONHarylalkyl$ or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "alkoxy" generally refers to an alkyl group that is singularly bonded to oxygen; thus, R—O, where R has C1-C10 carbon atoms. The example of alkoxy includes but is not limited to methoxyl group, second epoxide, propoxyl group, isopropoxy, butoxy, isobutoxy, amoxy, and hexyloxy.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{14}N$ and $^{15}N$, isotopes of oxygen include $^{16}O$, $^{17}O$ and $^{18}O$, and isotopes of sulfur include $^{32-34}S$ and $^{36}S$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As used herein, the term "surfactant" generally refers to the chemical compounds that decrease the surface tension or interfacial tension between two liquids, a liquid and a gas, or a liquid and a solid. The surfactants may include cationic surfactants, anionic surfactants, non-ionic surfactants, and Zwitterionic (amphoteric) surfactants. The cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB). A cationic surfactant may be replaced by a non-ionic surfactant, an anionic surfactant, a cationic surfactant, a viscoelastic surfactant, or a zwitterionic surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha-olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Zwitterionic (amphoteric) surfactants have both cationic and anionic groups attached to the same molecule. The zwitterionic surfactants include cocamidopropyl hydroxysultaine, CHAPS (3-[(3-cholamidopropyl) dimethylammonio]-1-propanesulfonate), ocamidopropyl betaine, phospholipids, and sphingomyelins.

Non-ionic surfactants have a polar group that does not have a charge. These include long-chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3-(CH_2)_{10-16}-(O-C_2H_4)_{1-25}-OH$, such as octaethylene glycol monododecyl ether and pentaethylene glycol monododecyl ether; polypropylene glycol alkyl ethers having the formula: $CH_3-(CH_2)_{10-16}-(O-C_3H_6)_{1-25}-OH$; glucoside alkyl ethers having the formula $CH_3-(CH_2)_{10-16}-(O\text{-glucoside})_{1-3}\text{-OH}$, such as decyl glucoside, lauryl glucoside, octyl glucoside; polyethylene glycol octylphenyl ethers having the formula $C_8H_{17}-(C_6H_4)-(O-C_2H_4)_{1-25}-OH$, such as Triton X-100; polyethylene glycol alkylphenyl ethers having the formula $C_9H_{19}-(C_6H_4)-(O-C_2H_4)_{1-25}-OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA); and a pesticide such as malathion, acephate and disulfoton.

As used herein, the term "alkylbenzene" refers to the chemical compound that contains a monocyclic aromatic ring attaching to one or more saturated hydrocarbon chains.

Aspects of the present disclosure are directed towards formulating an emulsifiable concentrate formulation of a neonicotinoid pesticide, such as nitenpyram. The formulation, when formulated appropriately with various solvents, such as methanol, xylene, and dimethyl formamide, and emulsifiers, such as calcium alkyl benzene sulfonate and castor oil ethoxylate in defined ratios. The EC formulation of the present disclosure imparts improved quality standards, such as increased shelf life (2 years) and emulsion stability, and is cost-effective. In some embodiments, the shelf life may be determined according to CIPAC Handbook F, Mt 36 Emulsion Characteristics of Emulsifiable Concentrates, which is incorporated herein by reference in its entirety. In some further embodiments, the shelf life may also be determined by other techniques known to those of skill in the art.

According to an aspect of the present disclosure, a stable emulsifiable concentrate (EC) formulation is described. The EC formulation includes a solvent mixture containing dimethylformamide (DMF), methanol, and xylene. In some embodiments, the stability and shelf life of the EC formulation is affected by a weight ratio of the individual solvent in the solvent mixture. In some embodiments, a volume ratio of DMF to methanol is in the range of 5:1 to 2:1, preferably 4:1, preferably 3:1, or even more preferably 2.5:1. In some embodiments, a volume ratio of methanol to xylene is in the range of 1:4 to 1:10, preferably 1:4 to 1:8, preferably 1:4 to 1:6, or even more preferably about 1:4.5. In some embodiments, a volume ratio of DMF to xylene is the range of 1:1 to 1:2, preferably 1:1.1, preferably 1:1.2, preferably 1:13, preferably 1:14, preferably 1:15, preferably 1:16, preferably 1:17, or even more preferably about 1:18. In some embodiments, a volume ratio of DMF to methanol in the range of 5:1 to 2:1, preferably 4:1 to 2:1, or even more preferably about 3:1. In some embodiments, a volume ratio of DMF to xylene is the range of 1:1 to 1:2; and a volume ratio of methanol to xylene is in the range of 1:4 to 1:10. In a preferred embodiment, a volume ratio of DMF to methanol to xylene is about 5:2:9. Other ranges are also possible. Although the examples provided describe the use of DMF, methanol, and xylene in the solvent mixture, it may be understood by a person skilled in the art that other solvents that are compatible with nitenpyram may be used as well, with slight variation in the ratios, as may be obvious to a person skilled in the art.

The EC formulation further includes one or more anionic surfactants selected from a C6-C20 linear alkylbenzene sulfonate surfactant, a C6-C20 linear or branched alkyl sulfate surfactant, a C6-C20 linear or branched alkyl alkoxy sulfate surfactant, and combinations thereof. The anionic surfactants are present in an amount of 1.5 to 7 wt. %, about 1.5 wt. %, about 2 wt. %, about 3 wt. %, about 4 wt. %, about 5 wt. %, about 6 wt. %, and preferably about 7 wt. % based on the total weight of the EC formulation. In a preferred embodiment, the anionic surfactant is calcium alkyl benzene sulphonate. In an embodiment, the calcium alkyl benzene sulfonate in an amount of 2.5 to 3.5 wt. %, preferably about 2.6 wt. %, about 2.7 wt. %, about 2.8 wt. %, about 2.9 wt. %, about 3.0 wt. %, about 3.1 wt. %, about 3.2 wt. %, 3.3 wt. %, about 3.4 wt. %, and about 3.5 wt. % based on the total weight of the EC formulation. Other ranges are also possible.

The EC formulation further includes one or more non-ionic surfactants. The non-ionic surfactants are present in an amount of 3 to 10 wt. %, preferably about 4 wt. %, about 5 wt. %, about 6 wt. %, about 7 wt. %, about 8 wt. %, about 9 wt. %, about 10 wt. % based on the total weight of the EC formulation. Suitable examples of non-ionic surfactants are polyglyceryl esters, polyglyceryl ethers, polyglyceryl sorbitan fatty acid esters, and combinations thereof. In a preferred embodiment, the non-ionic surfactant is castor oil ethoxylate. The castor oil ethoxylate is present in an amount of about 5 to 6.5 wt. %, preferably about 5.1 wt. %, about 5.2 wt. %, 5.3 wt. %, and about 5.4 wt. %, about 5.5 wt. %, about 5.6 wt. %, about 5.7 wt. %, about 5.8 wt. %, about 5.9 wt. %, about 6.0 wt. %, about 6.1 wt. %, about 6.2 wt. %, 6.3 wt. %, about 6.4 wt. %, and more preferably about 6.5 wt. % based on the total weight of the EC formulation. Other ranges are also possible.

The EC formulation may include an anti-foaming agent. In some embodiments, the anti-foaming agent is present in an amount of 0.0001 to 0.1 wt. % based on the total weight of the EC formulation, preferably 0.001 to 0.08 wt. %, preferably 0.01 to 0.06 wt. %, or even more preferably 0.02 to 0.04 wt. %. Other ranges are also possible. Suitable examples of anti-foaming agents include silicone, mineral oil(s) such as paraffinum liquidum, petrolatum, cera microcristallina, microcrystalline wax, ozokerite, ceresine isoparaffin, paraffin and synthetic wax, vegetable oil(s) such as olive, sunflower, palm, canola, coconut, safflower, corn, peanut, cottonseed, palm-kernel, and soybean oil, a fatty acid ester, an ether compound, a hydroxyl functional compound, an alcohol such as ethanol, methanol, propan-1-ol, propan-2-ol (isopropanol), butan-1-ol (n-butanol), butan-2-ol, tert-butanol, 2-methyl-propan-1-ol (iso-butanol), 2-methyl-propan-2-ol, pentan-3-ol, 2-methyl butan-1-ol, 3-methyl butan-1-ol, 1,2-ethanediol, 1,3-propandiol, 1,2-propandiol, cyclohexanol, and a phosphoric ester. In a preferred embodiment, the anti-foaming agent is silicone. The silicone is present in an amount of 0.01 to 0.05 wt. % based on the total weight of the EC formulation. Other ranges are also possible.

The EC formulation further includes a neonicotinoid pesticide. The concentration of the neonicotinoid pesticide is in an amount of 15 to 40% weight over volume (w/v), preferably 16 to 38% w/v, preferably 17 to 36% w/v, preferably 18 to 34% w/v, preferably 19 to 32% w/v, preferably 20 to 30% w/v, preferably 20 to 28% w/v, preferably 20 to 26% w/v, preferably 20 to 24% w/v, or even more preferably about 20% w/v of the solvent mixture. Other ranges are also possible. However, the amount of the neonicotinoid pesticide present in the EC formulation is about 50 to 100%, preferably 50%, about 60%, about 70%, about 80%, about 90%, and about 100% higher than the amount of the neonicotinoid present in the EC formulation that does not have the solvent mixture. Other ranges are also possible. Suitable examples of the neonicotinoid pesticide include nitenpyram, dinotefuran, clothianidin, acetamiprid, thiacloprid, and thiamethoxam, or a solvate thereof, a tautomer thereof, a stereoisomer thereof, or a mixture thereof.

In some embodiments, the neonicotinoid pesticide is dinotefuran, or a solvate thereof, a tautomer thereof, a stereoisomer thereof, or a mixture thereof. In some preferred embodiments, the neonicotinoid pesticide is dinotefuran. In some further preferred embodiments, dinotefuran is present in the EC formulation in an amount of about 20% w/v of the solvent mixture. Other ranges are also possible.

In some embodiments, the neonicotinoid pesticide is clothianidin, or a solvate thereof, a tautomer thereof, a stereoisomer thereof, or a mixture thereof. In some preferred embodiments, the neonicotinoid pesticide is clothianidin. In some further preferred embodiments, clothianidin is present in the EC formulation in an amount of about 20% w/v of the solvent mixture. Other ranges are also possible.

In some embodiments, the neonicotinoid pesticide is acetamiprid, or a solvate thereof, a tautomer thereof, a stereoisomer thereof, or a mixture thereof. In some preferred embodiments, the neonicotinoid pesticide is acetamiprid. In some further preferred embodiments, acetamiprid is present in the EC formulation in an amount of about 20% w/v of the solvent mixture. Other ranges are also possible.

In some embodiments, the neonicotinoid pesticide is thiacloprid, or a solvate thereof, a tautomer thereof, a stereoisomer thereof, or a mixture thereof. In some preferred embodiments, the neonicotinoid pesticide is thiacloprid. In some further preferred embodiments, thiacloprid is present in the EC formulation in an amount of about 20% w/v of the solvent mixture. Other ranges are also possible.

In some embodiments, the neonicotinoid pesticide is thiamethoxam, or a solvate thereof, a tautomer thereof, a stereoisomer thereof, or a mixture thereof. In some preferred embodiments, the neonicotinoid pesticide is thiamethoxam. In some further preferred embodiments, thiamethoxam is present in the EC formulation in an amount of about 20% w/v of the solvent mixture. Other ranges are also possible.

In a preferred embodiment, the neonicotinoid pesticide is nitenpyram, or a solvate thereof, a tautomer thereof, a stereoisomer thereof, or a mixture thereof. In some preferred embodiments, the neonicotinoid pesticide is nitenpyram. In some further preferred embodiments, nitenpyram is present in the EC formulation in an amount of about 20% w/v of the solvent mixture. Other ranges are also possible.

The EC formulation may further include a built-in adjuvant. As used herein, the term "built-in adjuvant" generally refers to one or more adjuvants that have been added to a particular formulation, such as a granule or liquid formulation, at the manufacturing stage of the product, rather than at the point of use of the product such as, for example, to a spray solution. The use of built-in adjuvants simplifies the use of agrochemical products for the end-user by reducing the number of ingredients that must be individually measured and applied.

In the present disclosure, the built-in adjuvant is a water-immiscible organic liquid. Suitable examples of water-immiscible organic liquids include carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, 2,2,4-trimethylpentane, and/or combinations thereof.

In some embodiments, the EC formulation of the present disclosure has a room temperature shelf life of at least 2 years under Collaborative International Pesticides Analytical Council Limited (CIPAC) guidelines (CIPAC Handbook F, Mt 36 Emulsion Characteristics of Emulsifiable Concentrates, which is incorporated herein by reference in its entirety).

In some embodiments, the EC formulation of the present disclosure has a pH value in a range of 5 to 9, preferably 6 to 8, or even more preferably about 7, as determined by CIPAC MT 75.3, which is incorporated herein by reference in its entirety. In some embodiments, the pH is determined by diluting the EC formulation in an aqueous liquid in a ratio of 0.1 to 10 by volume of the aqueous liquid, preferably 0.2 to 8% v/v, preferably 0.3 to 6% v/v, preferably 0.4 to 4% v/v, preferably 0.5 to 2% v/v, or even more preferably 0.6 to 1% v/v based on the total volume of the aqueous liquid. Other ranges are also possible.

In a preferred embodiment, the aqueous liquid is selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation, and is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some more preferred embodiment, the pH of the EC formulation has no more than 2 unit change, preferably no more than 1.5 unit change, preferably no more than 1 unit change, or even more preferably no more than 0.5 unit change compared to the pH of a freshly prepared EC formulation. Other ranges are also possible. In some most preferred embodiments, the pH of the EC formulation has no more than 2 unit change after 2 hours of storage, preferably after 12 hours of storage, preferably after 24 hours of storage, preferably after 7 days of storage, preferably after 14 days of storage, preferably after 4 weeks of storage, preferably after 1 year of storage, or even more preferably after 2 years of storage at a temperature of −5 to 40° C., preferably 0 to 30° C., or even more preferably 5 to 20° C. Other ranges are also possible.

In some embodiments, the EC formulation of the present disclosure has a free acidity in a range of 5 to 7, preferably 6 to 7, or even more preferably about 7, as determined by CIPAC MT 191, which is incorporated herein by reference in its entirety.

In some embodiments, the EC formulation of the present disclosure has an emulsion stability of less than 40% by volume of a total volume of an emulsion as determined by CIPAC MT 36.3 or MT 173, which is incorporated herein by reference in its entirety. In some further embodiments, the emulsion is substantially free from oil or phase separation.

In some embodiments, the EC formulation of the present disclosure has is stable at a temperature of −15 to −5° C., preferably about −10° C., as determined by CIPAC MT 39.3, which is incorporated herein by reference in its entirety. In some embodiments, the EC formulation is placed in a refrigerator at a temperature of about −10° C. for 5 to 14 days, preferably about 7 days. In some further embodiments, the EC formulation after storage remains clear and substantially free from precipice, phase separation and/or crystallization.

In some embodiments, the EC formulation of the present disclosure has an accelerated storage stability of less than or equal to 5% by weight of a total weight of the neonicotinoid pesticide present in the EC formulation, preferably less than or equal to 4% by weight, preferably less than or equal to 3% by weight, preferably less than or equal to 2% by weight, preferably less than or equal to 1% by weight, or even more preferably less than or equal to 0.5% by weight as determined by CIPAC MT 46 (CIPAC Handbook J, P 128 Mt 46.3 Accelerated Storage Procedure, which is incorporated herein by reference in its entirety). Other ranges are also possible.

In some embodiments, the neonicotinoid pesticide has a purity of at least 99 wt. % based on a total weight of the neonicotinoid pesticide, preferably at least 99.1 wt. %, preferably at least 99.3 wt. %, preferably at least 99.5 wt. %, preferably at least 99.7 wt. %, or even more preferably at least 99.9 wt. %, based on the total weight of the neonicotinoid pesticide. As used herein, the term "purity" of the present disclosure generally refers to a substance consists of only one specific chemical compound, without any impurities or contaminants.

In some embodiments, the neonicotinoid pesticide is nitenpyram. The accelerated storage stability of the EC formulation containing nitenpyram may be determined by high-performance liquid chromatography (HPLC). In the present disclosure, the HPLC is performed with a detector at a wavelength of 200 to 300 nanometers (nm), preferably about 245 nm, and a flow rate of about 1 to 5 milliliters per minute (mL/min), preferably about 2 mL/min. The mobile phase contains about 90 vol. % ACN, and about 10 vol % water. Each vol % based on a total volume of the mobile phase. The HPLC may be calibrated by washing with HPLC-grade methanol for 10 to 60 minutes, preferably about 30 minutes. All the conditions were set on the system, and 5 microliters (µL) standard solution was injected. Peaks were obtained between 0.5 to 5 minutes, preferably 1 to 2 minutes, and results were noted. After that, 5 µL of sample solution of the EC formulation was injected and results were calculated.

Figure 3A:
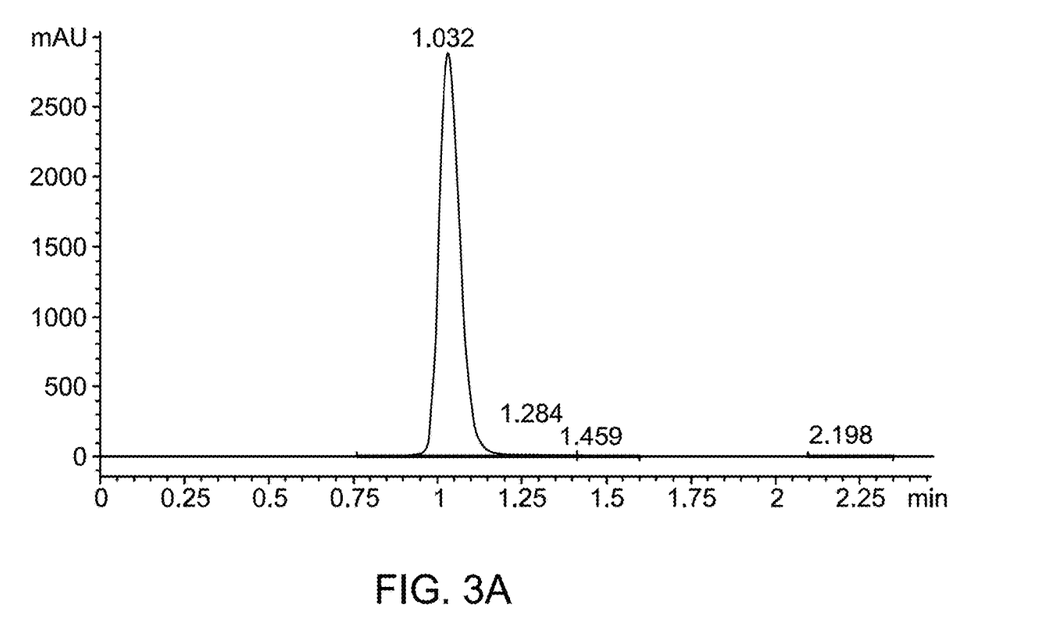
FIG. 3A is a chromatogram of a sample including 25% dimethylformamide (DMF), 45% xylene, 10% methanol, and 20% w/v nitenpyram, according to certain embodiments.
Figure 3B:
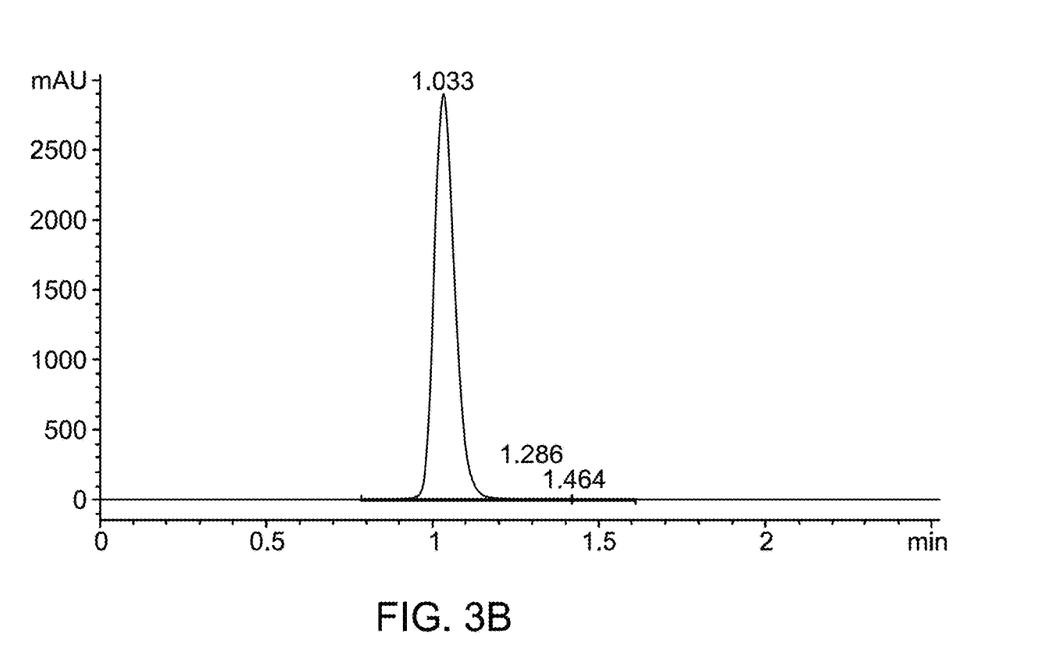
FIG. 3B is a chromatogram of a sample including 20% w/v nitenpyram EC formulation after 14 days, according to certain embodiments.

FIG. 3A illustrates a chromatogram of sample 6 including 25% dimethylformamide (DMF), 45% xylene, 10% methanol, and 20% w/v nitenpyram. FIG. 3B illustrates a chromatogram of sample 7 including 20% w/v nitenpyram EC formulation after 14 days. The EC formulation containing nitenpyram has less than 1 w/v % nitenpyram degradation, preferably less than 0.5 w/v % nitenpyram degradation, or even more preferably less than 0.1 w/v % nitenpyram degradation of the solvent mixture. Other ranges are also possible.

In some embodiments, the EC formulation of the present disclosure has a kinematic viscosity of at least 15 square millimeters per second (mm$^2$/s), preferably at least 20 mm$^2$/s, preferably at least 40 mm$^2$/s, or even more preferably at least 100 mm$^2$/s, as determined by CIPAC MT 192, which is incorporated herein by reference in its entirety. Other ranges are also possible.

In some embodiments, the EC formulation of the present disclosure has a pourability of no more than 5% by weight of a total weight of the EC formulation, preferably no more than 4% by weight, preferably no more than 3% by weight, preferably no more than 2% by weight, preferably no more than 1% by weight, or even more preferably no more than 0.25% by weight of the total weight of the EC formulation, as determined by CIPAC MT 148, which is incorporated herein by reference in its entirety. Other ranges are also possible.

In some embodiments, the EC formulation of the present disclosure has a water content of no more than 3% by weight of the total weight of the EC formulation, preferably no more than 2% by weight, preferably no more than 1% by weight, preferably no more than 0.5% by weight, preferably no more than 0.25% by weight, or even more preferably no more than 0.1% by weight of the total weight of the EC formulation, as determined by Karl Fischer titration method or similar methods known to those of ordinary skill in the art. Other ranges are also possible.

In a preferred embodiment, the solvent mixture has a DMF to methanol to xylene volume ratio of 5:2:9. The anionic surfactant is preferably calcium alkyl benzene sulfonate, and is present in an amount of about 2.5 to 3.5 wt. %, including about 2.5 wt. %, about 2.6 wt. %, about 2.7 wt. %, about 2.8 wt. %, about 2.9 wt. %, about 3.0 wt. %, about 3.1 wt. %, about 3.2 wt. %, 3.3 wt. %, about 3.4 wt. %, and preferably about 3.5 wt. % based on the total weight of the EC formulation. The non-ionic surfactant is castor oil ethoxylate and is present in an amount of about 5 to 6.5 wt. %, including about 5.0 wt. %, about 5.1 wt. %, about 5.2 wt. %, 5.3 wt. %, and about 5.4 wt. %, about 5.5 wt. %, about 5.6 wt. %, about 5.7 wt. %, about 5.8 wt. %, about 5.9 wt. %, about 6.0 wt. %, about 6.1 wt. %, about 6.2 wt. %, 6.3 wt. %, about 6.4 wt. %, and about 6.5 wt. % based on the total weight of the EC formulation. The anti-foaming agent is silicone and is present in an amount of 0.01 to 0.05 wt. % based on the total weight of the EC formulation. The neonicotinoid pesticide is nitenpyram in the amount of 20% w/v of the solvent mixture. Other ranges are also possible.

Figure 1:
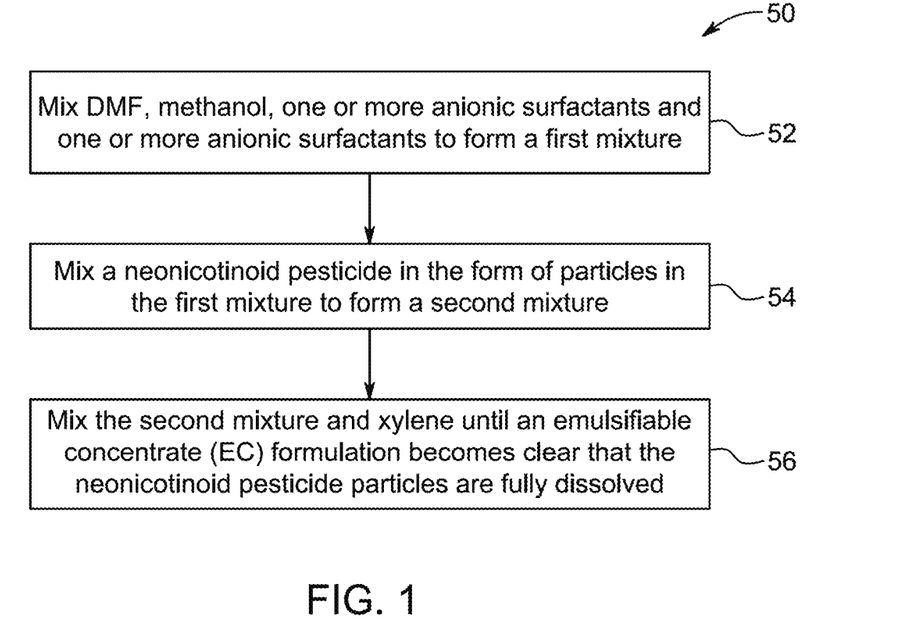
FIG. 1 is a schematic flow chart of a method of making the emulsifiable concentrate (EC) formulation, according to certain embodiments.

FIG. 1 illustrates a schematic flow chart of a method 50 of making the emulsifiable concentrate (EC) formulation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing DMF, methanol, one or more anionic surfactants and one or more non-ionic surfactants to form a first mixture. In some embodiments, the DMF and methanol are mixed in a volume ratio in the range of 5:1 to 2:1, preferably 4:1, preferably 3:1, preferably 2.5:1. Other ranges are also possible. The anionic surfactant is calcium alkyl benzene sulphonate, and the non-ionic surfactant is castor oil etho-oxalate. DMF, methanol, the one or more anionic surfactants, and the one or more non-ionic surfactants are mixed by modes known to those of ordinary skill in the art; for example, via stirring, swirling, or a combination thereof may be employed to form the resultant mixture.

At step 54, the method 50 includes mixing the neonicotinoid pesticide in the form of particles in the first mixture to form a second mixture. Suitable examples of the neonicotinoid pesticide include Nitenpyram, dinotefuran, clothianidin, acetamiprid, thiacloprid, and thiamethoxam. In some embodiments, the neonicotinoid pesticide is dinotefuran. In some embodiments, the neonicotinoid pesticide is clothianidin. In some embodiments, the neonicotinoid pesticide is acetamiprid. In some embodiments, the neonicotinoid pesticide is thiacloprid. In some embodiments, the neonicotinoid pesticide is thiamethoxam. In a preferred embodiment, the neonicotinoid pesticide is nitenpyram.

At step 56, the method 50 includes mixing the second mixture and xylene until the EC formulation becomes clear that the neonicotinoid pesticide particles are fully dissolved. Xylene was used as it is the backbone for the emulsion formation in preparing emulsifiable concentrate products.

In some embodiments, a method for insect control is described. The method includes mixing the EC formulation and water to form an emulsion, including a plurality of oil droplets. An effective amount of the emulsion may be further applied to plants, seeds, soil, or the habitat of plants in or on which the harmful insects are growing or may grow. As used herein, "effective amount or effective amounts" means that the amount which, when applied to the treatment of crops/plants, is sufficient to impact such treatment. The emulsion can be applied by spraying, dipping, dripping, brushing, immersing, flowing, exposing, pouring, and wiping.

In some embodiments, the oil droplets of the emulsion have an average particle size in a range of 0.5 to 100 nanometers (nm), preferably 1 to 90 nm, preferably 5 to 80 nm, preferably 10 to 60 nm, preferably 15 to 40 nm, or even more preferably about 20 nm. In some further embodiments, the oil droplets of the emulsion have an average particle size in a range of 100 nm to 20 micrometers (μm), preferably 500 nm to 18 μm, preferably 1 to 16 μm, preferably 2 to 14 μm, preferably 3 to 12 μm, preferably 4 to 10 μm, preferably 5 to 8 μm, or even more preferably about 6 μm. Other ranges are also possible. In some more preferred embodiments, the particle size of the oil droplets may be determined using techniques described herein or known to those of skill in the art, such as dynamic light scattering (DLS), laser diffraction, and/or electron microscopy.

EXAMPLES

The following examples demonstrate an emulsifiable concentrate (EC) formulation of a nicotinoid pesticide, e.g., Nitenpyram, as described herein. The examples are provided solely for illustration and are not to be construed as limitations of the present disclosure, as many variations thereof are possible without departing from the spirit and scope of the present disclosure.

Example 1: Selection of Solvent Mixture

The following solvents were selected based on their compatibility with nitenpyram: xylene, methanol, and dimethyl formamide (DMF). Xylene was considered the major solvent as it is the backbone for the emulsion formation in preparing emulsifiable concentrate products. The percentage of the methanol and DMF were set accordingly. The affinity of nitenpyram ((E)-$N^1$-[(6-Chloropyridin-3-yl)methyl]-$N^1$-ethyl-$N'^1$-methyl-2-nitroethene-1,1-diamine) towards the DMF is more relative to methanol. So, the following set of experiments was conducted using preferably about 21.052 grams (g) of nitenpyram technical (TC: 99.1% purity basis):

TABLE 1

Experimental trials for the selection of appropriate solvent combination

| Sample # | Solvent Ratio | | | Color | Homogeneity |
|---|---|---|---|---|---|
| | DMF (%) | Methanol (%) | Xylene (%) | | |
| 1 | 10 | 0 | 69 | Orange | Undissolved particles are visible |
| 2 | 15 | 0 | 64 | Orange | |
| 3 | 20 | 0 | 60 | Orange | |
| 4 | 25 | 0 | 55 | Orange | A homogenous translucent liquid |
| 5 | 25 | 5 | 50 | Orange | A homogenous translucent liquid |
| 6 | 25 | 10 | 45 | Orange | A homogenous and clear solution |

The final solvent system with a ratio of DMF: Methanol: Xylene, for example preferably about 5:2:9 outperforms other samples including those described in conventional compositions based on solubility and visual analysis of the product.

Example 2: Selection of Emulsifiers

The emulsification of the product following the rules & regulations set by the DPP (Department of Plant Protection) and CIPAC (Collaborative International Pesticides Analytical Council) were also performed. For this purpose, preferably two emulsifiers were used to prepare 2 different solution mixtures of calcium alkyl benzene sulphonate (CDBL-P), and castor oil ethooxalate (Mul-1285) according to the procedures described as follows:

Solution 1 was prepared by: about 10 mL of methanol was added to 25 milliliters (mL) of DMF in the beaker, followed by 9 g of CDBL-P while stirring. Afterward, 21.052 g nitenpyram technical was added to the above mixture with constant stirring. Then, 45 mL of xylene was added to the mixture and stirred until a clear solution was obtained.

Solution 2 was prepared by: in the mixture of 25 mL DMF and 10 mL methanol, 9 g of Mul-1285 was added and stirred. Then, 21.052 g of nitenpyram technical was added to the mixture. Afterward, 45 mL of xylene was added to the mixture and stirred until a clear solution was obtained.

The 20% w/v EC Nitenpyram product was prepared as follows: in the mixture of 25 ml DMF and 10 ml Methanol, 3.15 g CDBL-P and 5.85 g of Mul-1285 were added and stirred. Then, 21.052 g of Nitenpyram TC was added to the stirring mixture. Afterwards, 45 mL of Xylene was added to the mixture and stirred until a clear solution was obtained. The finally obtained product was subjected to different quality assurance tests by following the CIPAC guidelines, i.e., CIPAC MT 36.3 which is incorporated herein by reference in its entirety.

Initially, 10 different trial samples were prepared by mixing the above two solutions using their different ratios. Sample (a) contained only 10 mL of solution 1; Sample (b) contained 9 mL from solution 1 and 1 mL from solution 2; Sample (c) contained 8 mL from solution 1 and 2 mL from solution 2; Sample (d) contained 7 mL from solution 1 and 3 mL from solution 2; Sample I contained 6 mL from solution 1 and 4 mL from solution 2; Sample (f) contained 5 mL from solution 1 and 5 mL from solution 2; Sample (g) contained 4 mL from solution 1 and 6 mL from solution 2; Sample (h) contained 3 mL from solution 1 and 7 mL from solution 2; Sample (i) contained 2 mL from solution 1 and 8 mL from solution 2; Sample (j) contained 1 mL from solution 1 and 9 mL from solution 2. All the above sample mixtures were subjected to the emulsion stability test.

Example 3: Emulsion Stability

An emulsion is formed in standard water, and the stability of the emulsion is then determined by the amount of free oil or cream by following the standard guidelines as given in Table 2.

TABLE 2

CIPAC guidelines for the emulsion stability of EC products

| Time after dilution (h) | Limits of Stability | Results |
|---|---|---|
| 0 | Initial emulsifiability | Complete |
| 0.5 | Cream | Max. 2 mL |
| 1 | Cream | Max. 4 mL |
| 2 | Free Oil | Nil |
| 24 | Re-emulsification | Complete |
| 24.5 | Cream | Max. 4 mL |
| 24.5 | Free Oil | Nil |

Figure 2A:
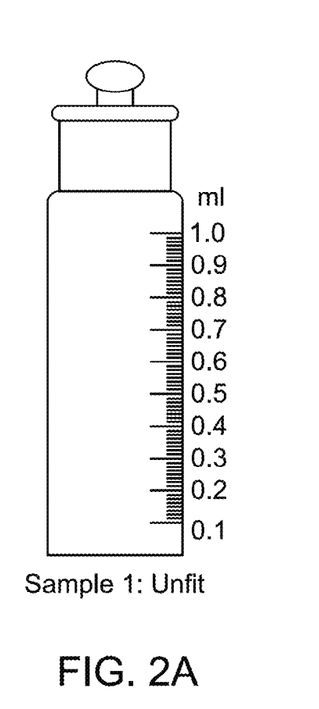
FIG. 2A is a schematic image of oil (sample 1: unfit), according to certain embodiments.
Figure 2B:
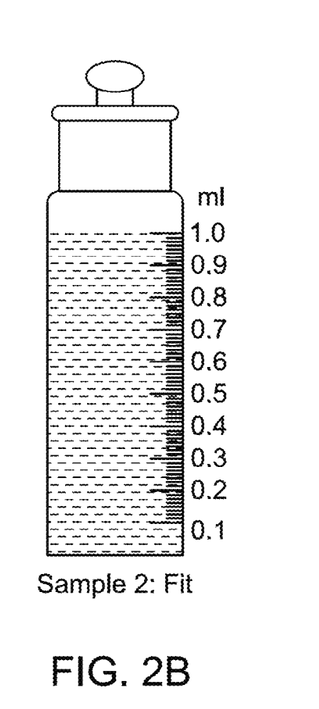
FIG. 2B depicts a schematic image of a complete emulsion (sample 2: fit), according to certain embodiments.

After viewing the emulsion stability results, another trial, K, was prepared by mixing 3.5 mL from solution 1 and 6.5 mL from solution 2, and the emulsion was checked. The results are given in Table 3. The findings showed that the combination CDBL-P=3.15 g and Mul-1285=5.85 g performed exceptionally well. FIGS. 2A-2B depict an illustration of the appearance of oil (sample 1 (A): Unfit) and complete emulsion (sample 11 (K): fit).

TABLE 3

Experimental trials for the selection of appropriate emulsifier combination

| Sample # | Ratio of Solution | | After 0 h Emulsion | After 0.5 h | | After 2 h | | Re-emulsification | After 24.5 h | | Results |
|---|---|---|---|---|---|---|---|---|---|---|---|
| | 1 | 2 | | Cream | Oil | Cream | Oil | | Cream | Oil | |
| A | 100 | 0 | Complete | 3.5 | 3 | 6 | 5 | Complete | 5 | 3.5 | Unfit |
| B | 90 | 10 | Complete | 3.5 | 2.5 | 5.5 | 4.5 | Complete | 4.5 | 3 | Unfit |
| C | 80 | 20 | Complete | 3 | 2 | 5 | 4 | Complete | 4 | 2.5 | Unfit |
| D | 70 | 30 | Complete | 3.5 | 1.5 | 4.5 | 3 | Complete | 3.5 | 2 | Unfit |
| E | 60 | 40 | Complete | 3 | 1 | 4 | 2 | Complete | 3 | 1.5 | Unfit |

TABLE 3-continued

Experimental trials for the selection of appropriate emulsifier combination

| Sample # | Ratio of Solution 1 | Ratio of Solution 2 | Emulsion | After 0 h Cream | After 0 h Oil | After 0.5 h Cream | After 0.5 h Oil | After 2 h Cream | After 2 h Oil | Re-emulsification | After 24.5 h Cream | After 24.5 h Oil | Results |
|---|---|---|---|---|---|---|---|---|---|---|---|---|---|
| F | 50 | 50 | Complete | 2.5 | 0.5 | 3.5 | 1 | | | Complete | 2.5 | 1 | Unfit |
| G | 40 | 60 | Complete | 1 | Nil | 2 | Nil | | | Complete | 2 | Nil | Fit |
| H | 30 | 70 | Complete | 1.5 | Nil | 2.5 | Nil | | | Complete | 1.5 | Nil | Fit |
| I | 20 | 80 | Complete | 2.5 | 3 | 3.5 | 3.5 | | | Complete | 2.5 | 3 | Unfit |
| J | 10 | 90 | Complete | 3.5 | 3.5 | 4 | 4 | | | Complete | 3.5 | 3.5 | Unfit |
| K | 35 | 65 | Complete | Nil | Nil | Nil | Nil | | | Complete | Nil | Nil | Fit |

| Sample # | Ratio of Solution 1 | Ratio of Solution 2 | After 0 h Emulsion | After 0.5 h Cream | After 0.5 h Oil | After 2 h Cream | After 2 h Oil | Re-emulsification | After 24.5 h Cream | After 24.5 h Oil | Results |
|---|---|---|---|---|---|---|---|---|---|---|---|
| F | 50 | 50 | Complete | 2.5 | 0.5 | 3.5 | 1 | Complete | 2.5 | 1 | Unfit |
| G | 40 | 60 | Complete | 1 | Nil | 2 | Nil | Complete | 2 | Nil | Fit |
| H | 30 | 70 | Complete | 1.5 | Nil | 2.5 | Nil | Complete | 1.5 | Nil | Fit |
| I | 20 | 80 | Complete | 2.5 | 3 | 3.5 | 3.5 | Complete | 2.5 | 3 | Unfit |
| J | 10 | 90 | Complete | 3.5 | 3.5 | 4 | 4 | Complete | 3.5 | 3.5 | Unfit |
| K | 35 | 65 | Complete | Nil | Nil | Nil | Nil | Complete | Nil | Nil | Fit |

Example 4: Accelerated Storage Stability

Accelerated storage stability gives information on shelf life. It is determined by placing a sample in the closed glass bottle at a specified temperature in the oven for a definite period. Following are the temperatures at which the sample can be stored for a specific time: 54±2° C. for 14 days; 50±2° C. for 4 weeks; 45±2° C. for 6 weeks; 40±2° C. for 8 weeks; 35±2° C. for 12 weeks; 30±2° C. for 18 weeks. To determine shelf life, the final sample was sealed in a well-cleaned and dried glass bottle and kept in the oven at 54±2° C. for 14 days. Afterward, the stability was checked using high-performance liquid chromatography (HPLC). The results are showcased in Table 4 (CIPAC Handbook J, P 128 Mt 46.3 Accelerated Storage Procedure, which is incorporated herein by reference in its entirety).

TABLE 4

Active Assay analysis of specified trials using HPLC.

| Serial # | Sample Name | Active Assay % (w/v) out of 20% w/v measured through HPLC | Result |
|---|---|---|---|
| 1 | DMF 10% + Xylene 69% | 7.42 | Unfit |
| 2 | DMF 15% + Xylene 64% | 17.33 | Unfit |
| 3 | DMF 20% + Xylene 60% | 18.59 | Fit |
| 4 | DMF 25% + Xylene 55% | 18.86 | Fit |
| 5 | DMF 25% + Xylene 50% + Methanol 5% | 19.14 | Fit |
| 6 | DMF 25% + Xylene 45% + Methanol 10% | 19.97 | Fit |
| 7 | Sample after completing 14 Days Storage stability Test | 19.72 | Fit |

Example 5: Assay Active Determination Using HPLC

The conditions employed for HPLC determination of nitenpyram were as follows: wavelength (245 nanometers (nm)), flow rate (2 milliliters per minute (mL/min)), mobile phase (ACN (90), (water) (10)). HPLC was calibrated and washed with HPLC-grade methanol for 30 minutes. All the conditions were set on the system, and 5 microliters (μL) standard solution was injected. Peaks were obtained between 1 and 2 minutes, and results were noted. After that, 5 μL of sample solution was injected and results were calculated. FIGS. 3A-3B illustrate chromatogram of sample 6 (DMF 25%+xylene 45%+methanol 10% solution of Nitenpyram 20% w/v) and chromatogram of sample 7 (Nitenpyram 20% w/v EC product) after 14 days, respectively.

In the present disclosure, an EC formulation is disclosed. The EC compositions have a shelf-life stability of 2 years, and the solvents used for their preparation are cost-effective. Appropriate solvents and emulsifiers are screened and disclosed through several trials, 20% w/v SL of nitenpyram was formulated, and parameters (emulsion stability, storage stability, and assay active analysis), as recommended by CIPAC, were accessed by finding storage stability analysis and assay active determination using HPLC. Nitenpyram, 20% w/v EC product, well-qualified maximum emulsion stability, storage stability, and assay active analysis. The EC formulation of the present disclosure finds applications in agriculture, where farmers and agricultural companies face a dilemma of NPM degradation, uneconomical prices, and easy availability.

Numerous modifications and variations of the present disclosure are possible in light of the above teachings. It is therefore to be understood that within the scope of the appended claims, the invention may be practiced otherwise than as specifically described herein.

The invention claimed is:

1. A stable emulsifiable neonicotinoid pesticide (EC) concentrate, comprising:
    a solvent mixture comprising dimethylformamide (DMF), methanol, and xylene;
    one or more anionic surfactants present in an amount of 1.5 to 7 wt. % based on a total weight of the EC concentrate;
    one or more non-ionic surfactants present in an amount of 3 to 10 wt. % based on the total weight of the EC concentrate; and
    a neonicotinoid pesticide;
    wherein the neonicotinoid pesticide is present in an amount of 15 to 40% weight over volume (w/v) of the solvent mixture; and
    wherein the EC concentrate has a room temperature shelf life of at least 2 years under CIPAC guidelines,
    wherein a volume ratio of DMF to methanol to xylene is about 5:2:9.

2. The EC concentrate of claim 1, wherein the amount of the neonicotinoid pesticide present in the EC concentrate is about 50 to 100% higher than an amount of the neonicotinoid present in an EC concentrate that does not have the solvent mixture.

3. The EC concentrate of claim 1, wherein the neonicotinoid pesticide is at least one selected from the group consisting of nitenpyram, dinotefuran, clothianidin, acetamiprid, thiacloprid, and thiamethoxam.

4. The EC concentrate of claim 1, wherein the neonicotinoid pesticide is nitenpyram.

5. The EC concentrate of claim 1, wherein the one or more anionic surfactants are selected from the group consisting of a C6-C20 linear alkylbenzene sulfonate surfactant, a C6-C20 linear or branched alkyl sulfate surfactant, a C6-C20 linear or branched alkyl alkoxy sulfate surfactant, and combinations thereof.

6. The EC concentrate of claim 1, wherein the one or more non-ionic surfactants are selected from the group consisting of a polyglyceryl ester, a polyglyceryl ether, a polyglyceryl sorbitan fatty acid ester, and combinations thereof.

7. The EC concentrate of claim 1, further comprising a built-in adjuvant, and wherein the built-in adjuvant is a water-immiscible organic liquid.

8. A stable emulsifiable neonicotinoid pesticide concentrate (EC), comprising:
- a solvent mixture comprising dimethylformamide (DMF), methanol, and xylene;
- one or more anionic surfactants;
- one or more non-ionic surfactants; and
- a neonicotinoid pesticide;
- wherein the neonicotinoid pesticide is nitenpyram and is present in an amount of 20% weight over volume (w/v) of the solvent mixture; and
- wherein the EC concentrate has a room temperature shelf life of at least 2 years under CIPAC guidelines,
- wherein the solvent mixture has a DMF to methanol to xylene volume ratio of 5:2:9;
- the one or more anionic surfactants comprise calcium alkyl benzene sulfonate in an amount of 2.5 to 3.5 wt. % based on the total weight of the EC concentrate;
- the one or more non-ionic surfactants comprise castor oil ethoxylate in an amount of 5 to 6.5 wt. % based on the total weight of the EC concentrate.

* * * * *

UNITED STATES PATENT AND TRADEMARK OFFICE
CERTIFICATE OF CORRECTION

| | | |
|---|---|---|
| PATENT NO. | : 12,274,265 B1 | Page 1 of 1 |
| APPLICATION NO. | : 18/968074 | |
| DATED | : April 15, 2025 | |
| INVENTOR(S) | : Nadeem Raza et al. | |

It is certified that error appears in the above-identified patent and that said Letters Patent is hereby corrected as shown below:

On the Title Page

Item (72) Inventors' Residence Information should read as follows:
--(72) Inventors: Nadeem Raza, Riyadh (SA);
Sabir Razzaq, Multan (PK);
Suryyia Manzoor, Multan (PK);
Waseem Raza, Shenzen (CN);
Muhammad Hayat, Multan (PK);
Faisal K. Algethami, Riyadh (SA)--

Signed and Sealed this
Twentieth Day of May, 2025

Coke Morgan Stewart
*Acting Director of the United States Patent and Trademark Office*